United States Patent [19]

Hunziker

[11] Patent Number: 4,898,927
[45] Date of Patent: Feb. 6, 1990

[54] NON-FUSIBLE POLYMER INSOLUBLE IN ORGANIC SOLVENTS FROM 1,3,5,7-TETRATHIA-S-INDACENE-2,6-DITHIONE

[75] Inventor: Max Hunziker, Düdingen, Switzerland

[73] Assignee: Ciba-Geigy Corporation, Ardsley, N.Y.

[21] Appl. No.: 218,768

[22] Filed: Jul. 14, 1988

[30] Foreign Application Priority Data

Jul. 24, 1987 [CH] Switzerland ............ 2825/87
Jul. 30, 1987 [CH] Switzerland ............ 2915/87

[51] Int. Cl.$^4$ .............................. C08G 75/00
[52] U.S. Cl. .................... 528/377; 252/501.1; 252/518; 524/599; 524/609; 528/86; 528/360
[58] Field of Search ............ 528/377, 86, 360; 252/501.1, 518; 524/599, 609

[56] References Cited

U.S. PATENT DOCUMENTS 4,111,857 9/1978 Engler et al. ............ 528/377

OTHER PUBLICATIONS

Tetrahedron Letters, No. 26(1977), pp. 2223 et. seq.
Chimia 40(1986), No. 6, pp. 200, et. seq.
J. Fuer Praktische Chemie, vol. 320, issue 3, 1978, pp. 404, et. seq.
Chemistry Letters (1975), pp. 603–606.

Primary Examiner—Harold D. Anderson
Attorney, Agent, or Firm—Stephen V. O'Brien

[57] ABSTRACT

Non-fusible polymers which are insoluble in organic solvents and essentially are of the formula I

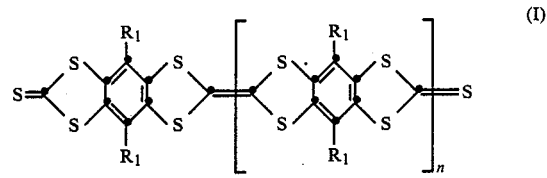

(I)

in which n is 2 or a number greater than 2 and each radical $R_1$ independently is —H, $C_1$–$C_{20}$alkyl, $C_1$–$C_{20}$alkoxy, aryl or aryloxy with up to 12 C atoms, aralkyl with up to 20 C atoms, alkaryl with up to 20 C atoms, —CN, —OCOR$_2$, —OH or —SR$_3$, in which $R_2$ and $R_3$ independently of one another are each $C_1$–$C_{20}$alkyl or aryl with up to 12 C atoms, can be used as electrically conductive polymers after doping with oxidizing agents, for example iodine, bromine, $SbF_5$, $AsF_5$, $PF_5$ or $SbCl_5$.

10 Claims, No Drawings

NON-FUSIBLE POLYMER INSOLUBLE IN ORGANIC SOLVENTS FROM 1,3,5,7-TETRATHIA-S-INDACENE-2,6-DITHIONE

The present invention relates to non-fusible polymers, which are insoluble in organic solvents, of 1,3,5,7-tetrathia-s-indacene-2,6-dithiones, a process for their preparation and the use of the polymers in doped form as electrically conductive polymers.

The preparation of compounds which could be suitable as starting compounds for the preparation of poly(-tetrathiafulvalenes) of the formula shown is described in Tetrahedron Letters, No. 26 (1977), page 2223 et seq. The feasibility of the processes described for the preparation of these polymers, the reaction of 1,3,5,7-tetrathia-s-indacene-2,6-dithione with triethyl phosphite or the reaction of corresponding bisdithiolium salts with tertiary amines is not demonstrated, and polymers are not specifically described.

It is known from Chimia 40 (1986) No. 6, pages 200 et seq. that the reaction of 1,3,5,7-tetrathia-s-indacene-2,6-dithione with triethyl phosphite, which is also described in the abovementioned publication leads only to a dimeric condensation product.

Journal für praktische Chemie, Volume 320, Issue 3, 1978, pages 404 et seq. furthermore reports that the reaction of the phenylene- and diphenylene-bis-dithiolium salts mentioned therein with tertiary amines leads to a polymer which has a structure which is different to that given in the above-mentioned Tetrahedron Letters and is also described in Chemistry Letters (1975), 603 et seq. for the polymer obtained by reaction of propylene- and tetramethylene-bis-dithiolium salts with tertiary amines.

It has now been found that polymers of 1,3,5,7-tetrathia-s-indacene-2,6-dithiones are obtained in an easier and more economical manner if the monomeric compound is subjected to self-condensation in the temperature range from 300° to 400° C. and with exclusion of oxygen.

The present invention thus relates to non-fusible polymers which are insoluble in organic solvents and essentially are of the formula I

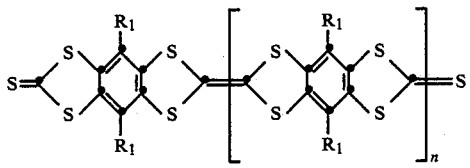 (I)

in which n is 2 or a number greater than 2 and each radical $R_1$ independently is —H, $C_1$-$C_{20}$alkyl, $C_1$-$C_{20}$alkoxy, aryl or aryloxy with up to 12 C atoms, aralkyl with up to 20 C atoms, alkaryl with up to 20 C atoms, —CN, —OCOR$_2$, —OH or —SR$_3$, in which $R_2$ and $R_3$ independently of one another are each $C_1$-$C_{20}$alkyl or aryl with up to 12 C atoms.

Preferably n in formula I is a number greater than 5, in particular greater than 10.

The substituents $R_1$ in formula I are preferably independently of one another each —H, $C_1$-$C_{20}$alkyl, $C_1$-$C_{20}$alkoxy or aryloxy with up to 12 C atoms.

In particular, each radical $R_1$ independently is —H, $C_1$-$C_4$alkyl or $C_1$-$C_4$alkoxy.

If $R_1$, $R_2$ and $R_3$ are each alkyl, this can be straight-chain or branched. Suitable alkyl radicals are, for example, methyl, ethyl, iso-propyl, n-butyl, isopentyl, n-heptyl, 2-ethylhexyl, n-decyl and n-do-decyl.

If $R_1$, $R_2$ and $R_3$ are each aryl, this can be, for example, phenyl, naphthyl or biphenyl.

Alkoxy $R_1$ can be straight-chain or branched. Examples of suitable alkoxy radicals which may be mentioned are: methoxy, ethoxy, isopropoxy, n-butoxy, isopentoxy and 2-ethylhexoxy.

Aryloxy $R_1$ is preferably phenoxy or naphthoxy.

An aralkyl radical $R_1$ is, for example, benzyl, phenethyl or phenylpropyl.

An alkaryl radical $R_1$ is, for example, tolyl, xylyl, ethylphenyl, propylphenyl, cumyl, tert-butylphenyl, n-butylphenyl, n-hexylphenyl or N-dodecylphenyl.

The polymers of the formula I according to the invention can be prepared by thermal self-condensation, sulfur being split off. This process comprises heating a 1,3,5,7-tetrathia-s-indacene-2,6-dithione of the formula II

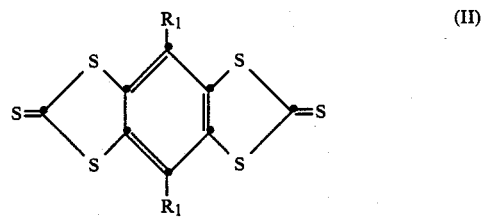 (II)

in which the two radicals $R_1$ are as defined in the case of formula I, to a temperature between 300° and 400° C. under an inert gas or in vacuo.

The process according to the invention for the preparation of polymers of the formula I is preferably carried out by heating a compound of the formula II at a temperature between 350° and 400° C. under an inert gas, such as, for example, nitrogen or argon.

The compounds of the formula II are essentially known compounds. 1,3,5,7-Tetrathia-s-indacene-2,6-dithione can be prepared, for example, in accordance with the instructions given in Chimia 40 (1986), pages 200–201. The compound of the formula II in which the two radicals $R_1$ are each a hydroxyl group can be prepared by a process described in Japanese Preliminary Published Specification 77/95,695 and Preliminary Published Specification 77/95,694. Compounds of the formula II in which the two radicals $R_1$ are different substituents, such as alkyl, alkoxy or aralkyl, can be prepared in accordance with the instructions disclosed in Tetrahedron Letters, 26 (1977), pages 2224 et seq.

The polymers of the formula I according to the invention are partly crystalline, generally black solids which are non-fusible and do not dissolve in organic solvents. If crystalline tetrathia-s-indacenedithiones are used as starting substances in the condensation reaction and the reaction is carried out on solids, the crystals are obtained in a changed form, for example as fibrous black needles. According to the IR spectrum, after the condensation reaction the C=S stretching vibration of the tetrathia-s-indacenedithione is very greatly weakened and shifted to about 1,062 cm$^{-1}$.

The polymers according to the invention can be doped by treatment with oxidizing agents, for example chlorine, bromine, iodine, metal pentahalides or metalloid pentahalides, electrically conductive polymers being obtained. Using gaseous oxidizing agents, doping is carried out with exclusion of water and air in vacuo at room temperature.

Doping can also be carried out in solutions of the oxidizing agents in question, these being dissolved in an inert organic solvent. For this, the polymers are stirred, as suspended solids, in the solution of the oxidizing agent at room temperature for 24 hours and are then filtered off and washed with pure solvent.

The invention thus furthermore relates to polymers of the formula I which are in doped form as a result of treatment with chlorine, bromine, iodine, metal pentahalides or metalloid pentahalides or other powerful oxidizing agents, and to their use as electrically conductive polymers.

Chlorine, bromine, iodine, $PF_5$, $AsF_5$ or $SO_3$ is preferably used as the doping agent for the polymers of the formula I, the electrically conductive polymers which can preferably be used being obtained.

For doping the polymers of the formula I, the oxidizing agents are in general used in amounts such that at least 10 mol % of the recurring structural unit in the polymer are present in the oxidized form or contain an anion derived from chlorine, bromine, iodine, a metal pentahalide or a metalloid pentahalide or another powerful oxidizing agent. Polymers of the formula I in which at least 20 mol %, in particular at least 30 mol %, of the recurring structural unit are present in oxidized form are preferred doped polymers.

The polymers according to the invention can be used in doped form in electronics or microelectronics, for example as electrically conductive fillers in antistatic treatment or electromagnetic shielding of electronic components, as electrode materials for batteries and for the production of sensors or semiconductor elements.

Preparation of 1,3,5,7-tetrathia-s-indacene-2,6-dithione 1 g of 1,2,4,5-tetramercaptobenzene is suspended in 20 ml of 1N sodium hydroxide solution and partly dissolved, with exclusion of air. 8 g of carbon disulfide (in excess) are then added and the mixture is heated to the reflux temperature. The mixture is boiled under reflux for 2 hours, with thorough stirring, and the product which has precipitated out as a yellow powder is then filtered off and washed with water, ethanol and ether. The crude product is recrystallized from 1,2,4-trichlorobenzene (TCB) or dimethylformamide and is obtained as long pale yellow needles. Yield: 80% of theory. IR spectrum: C=S 1,048 cm$^{-1}$, UV spectrum $\lambda_{max}$ 391 nm, log $\epsilon$=4.87; density $d_{20°C}$=1.8797 g/cm$^3$ (from TCB).

Preparation of 4,8-dimethyl-1,3,5,7-tetrathia-s-indacene-2,6-dithione (DMTTID)

800 mg of tetramercapto-p-xylene are dissolved in 20 ml of 1N NaOH saturated with argon, and 3.8 g of carbon disulfide are added. The mixture is then heated at 45° C. for two hours, with thorough stirring. The yellow product is then filtered off and washed with methanol, toluene and finally ether. Recrystallization from 1,2,4-trichlorobenzene (TCB) gives 934 mg of yellow needles (86% of theory).

Elemental analysis: calculated: C=37.71%, H=1.90%, S=60.39%; found: C=37.27%, H=1.91%, S=60.13%. IR spectrum: C=S 1,062 cm$^{-1}$. DSC: no melting point, exothermic decomposition from 400° C.

EXAMPLE 1

Polycondensation of 1,3,5,7-tetrathia-s-indacene-2,6-dithione (TTID)

A small glass bomb tube is filled with 1 g of TTID under argon or nitrogen as an inert gas and is closed. The bomb tube is then heated at 350° C. (metal bath or circulating air oven) for 2 hours (h). After cooling, 750 mg of black needles and, as a by-product, elemental sulfur are obtained. The product is washed thoroughly with hot 1,2,4-trichlorobenzene, alcohol and ether and dried at 100° C. The product is insoluble in all organic solvents. The sulfur content is 57.00%, corresponding to a degree of polymerization of about 30. The monomer has a sulfur content of 66.23%. The extremely high IR absorption of the C=S groups of the monomer at 1,048 cm$^{-1}$ appears greatly weakened in the polymer at 1,062 cm$^{-1}$ (end groups).

IR spectrum of the polymer (KBr): 3070 w, 1508 m, 1420 m, 1320 m, 1270 m, 1145 w, 1100 m, 1062 s, 850 m, 775 w, 640 w, 500 w (w=weak, m=moderate, s=strong).

The analytical data and specific conductivities of the polymers doped with $I_2$, $Br_2$ and $AsF_5$ are shown in Table 1.

EXAMPLE 2

The procedure is as in Example 1, but the reaction is carried out at 350° C. for 4 h. The analytical data and the specific conductivities of the polymers doped with $I_2$, $Br_2$ and $AsF_5$ are shown in Table 1.

EXAMPLE 3

The procedure is as in Example 1, but the reaction is carried out at 380° C. for 2 h. The analytical data and the specific conductivities of the polymers doped with $I_2$, $Br_2$ and $AsF_5$ are shown in Table 1.

Oxidation of the polymer from TTID

The oxidation (doping) is carried out with gaseous oxidizing agents with exclusion of water and air in vacuo at room temperature (RT). The doping of a polymer with $AsF_5$ is described below by way of example.

30–50 mg of the polymer are weighed into a weighing glass and then introduced into a stainless steel container which can be closed and is provided with a manometer and several metering valves. The container is then evacuated to $10^{-3}$ mbar several times and flooded again with extra pure argon (99.9999% pure). Finally, a high vacuum is generated, the vacuum connection is closed and $AsF_5$ is metered into the container via a metering valve until the partial pressure has reached 650–700 mbar. The container is then left to stand at RT for 24 h, a decrease in the $AsF_5$ partial pressure due to the absorption of $AsF_5$ by the polymer being recorded.

Excess $AsF_5$ is driven off with a stream of argon and volatile reaction products (e.g. $AsF_3$) are then removed in a dynamic vacuum (stream of argon) under $5 \times 10^{-1}$ mbar for 24 h. The container is then transferred to a glove box with a dry argon atmosphere, where the sample is removed and pressed to a pill and its conductivity is determined by the two-contact method. The procedure for oxidation with other oxidizing agents ($I_2$, $Br_2$ etc.) is analogous.

TABLE 1

| Example | Reaction temperature [°C] | Reaction time [h] | Elemental analysis C[%], | Elemental analysis S[%] | Specific conductivity $\lambda_{max}$ [S·cm$^{-1}$] I$_2$ | Br$_2$ | AsF$_5$ |
|---|---|---|---|---|---|---|---|
| 1 | 350 | 2 | 41.35 | 57.00 | $6 \cdot 10^{-7}$ | $3 \cdot 10^{-4}$ | $2 \cdot 10^{-5}$ |
| 2 | 350 | 4 | 41.62 | 56.50 | $9 \cdot 10^{-8}$ | $3 \cdot 10^{-4}$ | $2 \cdot 10^{-5}$ |
| 3 | 380 | 2 | 42.75 | 55.22 | $1 \cdot 10^{-8}$ | $7 \cdot 10^{-6}$ | $1.5 \cdot 10^{-5}$ |

EXAMPLES 4, 5 AND 6

The procedure is analogous to that of Example 1, but DMTTID is used instead of TTID and the mixture is heated at 380°–400° C. The pale yellow product in the form of needles becomes black, without the crystalline needles disintegrating. After doping with bromine under 20 mbar, the following conductivities are found:

| Example | Reaction temperature [°C] | Reaction time [h] | Specific conductivity [S·cm$^{-1}$] |
|---|---|---|---|
| 4 | 380–400 | 2 | $5.5 \cdot 10^{-5}$ |
| 5 | 380 | 2 | $2.3 \cdot 10^{-5}$ |
| 6 | 380 | ½ | $1 \cdot 10^{-5}$ |

An increase in conductivity is found with the longer reaction time.

USE EXAMPLE 1

A crystal obtained by the solids polycondensation carried out in Example 1 is stuck on both ends to a small glass support by means of a platinum conductive paste and provided with connecting wires. The specific resistance of the crystal is $>10^{10}$ Ω×cm. The crystal is now transferred to an atmosphere which has a bromine partial vapour pressure of $2.27\times10^4$ Pa. The resistance has fallen to $10^4$ Ω×cm after only 1 minute. After 5 minutes, a value of about $10^3$ Ω×cm is observed. The maximum conductivity measured on various crystals is $4$–$6\times10^{-3}$ S×cm$^{-1}$.

USE EXAMPLE 2

A black crystalline needle from Example 4 is contacted as described in Use Example 1 and then exposed to a bromine partial vapour pressure of $2.2\times10^4$ Pa. After 7 minutes, a maximum value of $10^{-4}$ S×cm$^{-1}$ is determined for the electrical conductivity.

What is claimed is:

1. A non-fusible polymer which is insoluble in organic solvents and essentially is of the formula I

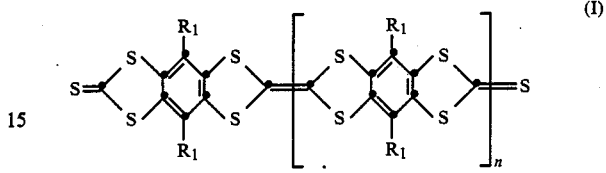

in which n is 2 or a number greater than 2 and each radical R$_1$ independently is —H, C$_1$-C$_{20}$alkyl, C$_1$-C$_{20}$alkoxy, aryl or aryloxy with up to 12 C atoms, aralkyl with up to 20 C atoms, alkaryl with up to 20 C atoms, —CN, —OCOR$_2$, —OH or —SR$_3$, in which R$_2$ and R$_3$ independently of one another are each C$_1$-C$_{20}$alkyl or aryl with up to 12 C atoms.

2. A polymer according to claim 1, in which n in formula I is a number greater than 5.

3. A polymer according to claim 1, in which each radical R$_1$ independently is —H, C$_1$-C$_{20}$alkyl, C$_1$-C$_{20}$alkoxy or aryloxy with up to 12 C atoms.

4. A polymer according to claim 1, in which each radical R$_1$ independently is —H, C$_1$-C$_4$alkyl or C$_1$-C$_4$alkoxy.

5. A polymer according to claim 1, in which each radical R$_1$ in formula I is a hydrogen atom.

6. A polymer according to claim 1, in which each radical R$_1$ in formula I is methyl.

7. A process for the preparation of a polymer of the formula I according to claim 1, which comprises heating a 1,3,5,7-tetrathia-s-indacene-2,6-dithione of the formula II

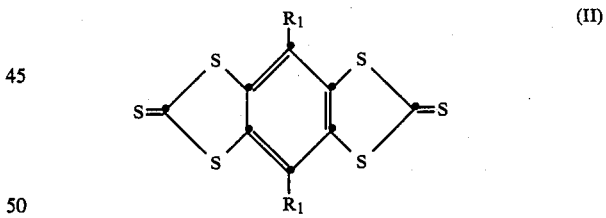

in which the two radicals R$_1$ are as defined in the case of formula I, to a temperature between 300° and 400° C. under an inert gas or in vacuo.

8. The process according to claim 7, wherein a temperature of between 350° and 400° C. is applied.

9. A composition comprising a polymer according to claim 1 doped with chlorine, bromine, iodine, a metal pentahalide or a metalloid pentahalide or another powerful oxidizing agent.

10. A composition comprising a polymer according to claim 1 doped with chlorine, bromine, iodine, PF$_5$, AsF$_5$ or SO$_3$.